UNITED STATES PATENT OFFICE.

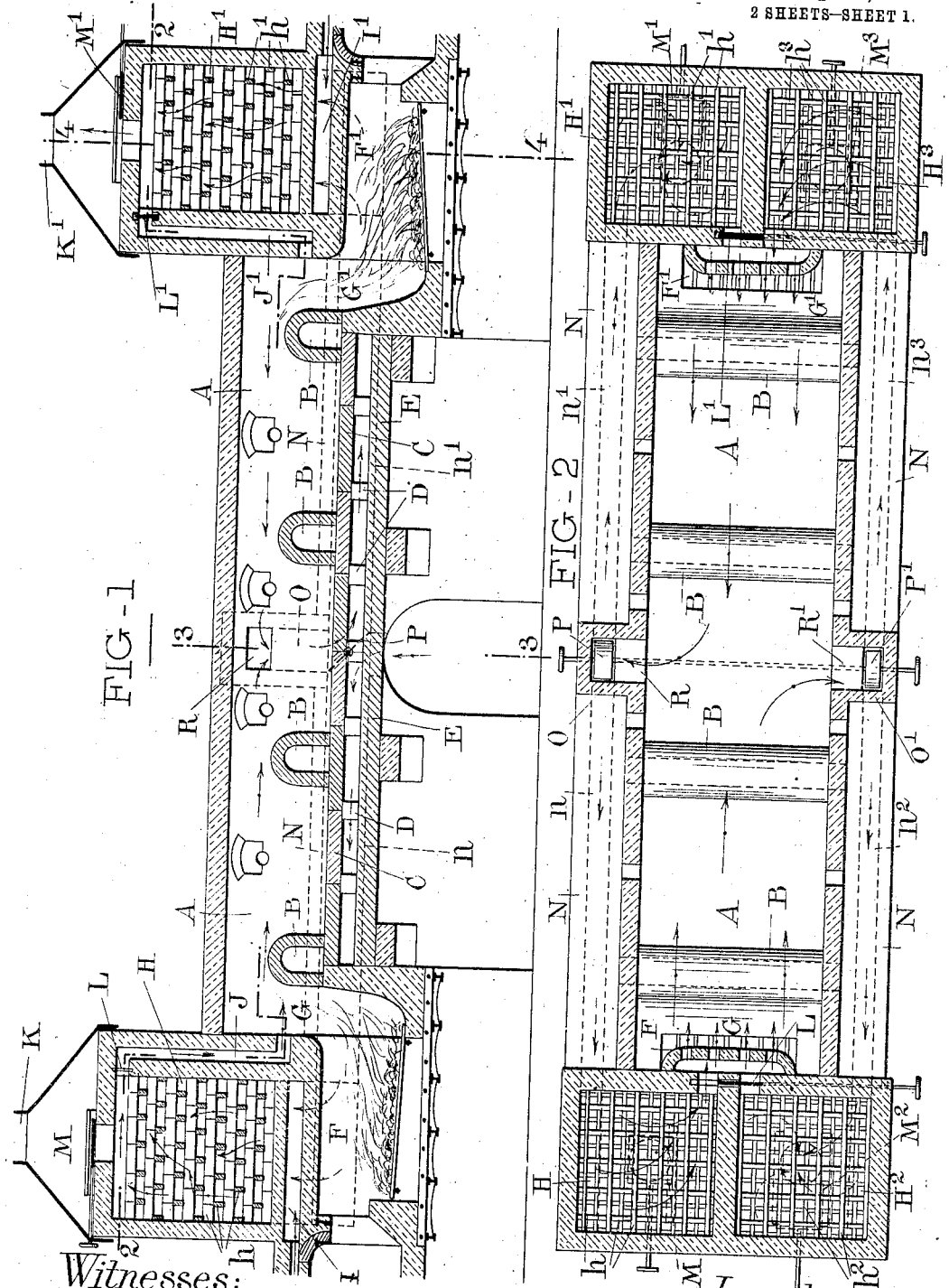

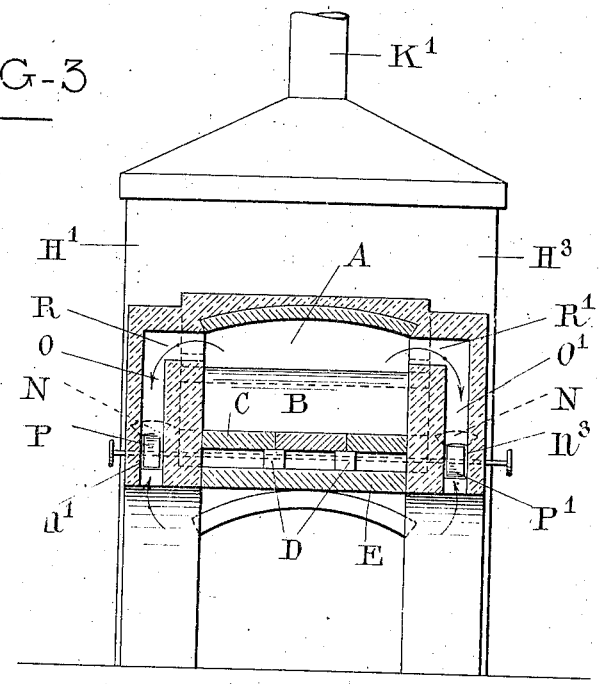
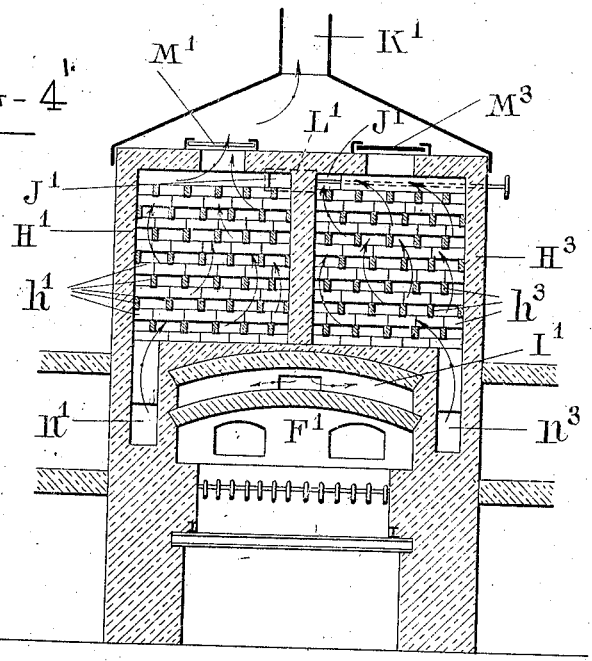

ANTOINE VERZIER, OF GRAND-CROIX, FRANCE, ASSIGNOR TO SOCIÉTÉ FRANCAISE D'EXPLOITATION DE FOURS SPÉCIAUX À HAUTE TEMPERATURE, OF PARIS, FRANCE.

REVERBERATORY FURNACE.

1,058,647.   Specification of Letters Patent.   Patented Apr. 8, 1913.

Application filed July 30, 1912. Serial No. 712,285.

*To all whom it may concern:*

Be it known that I, ANTOINE VERZIER, a citizen of the French Republic, residing at Grand-Croix, Loire, in France, have invented certain new and useful Improvements in Reverberatory Furnaces, of which the following is a specification.

The present invention relates to improvements in reverberatory furnaces for melting substances requiring high temperatures such as steel, etc.

In the improved furnace the heat is furnished by two combustion chambers arranged one at each extremity of the furnace the gases being directed into chambers operating alternately as absorbing and as heating regenerating chambers placed above the said combustion chambers before they pass out through the chimneys. The furnace is also provided with means for regenerating the combustion gases by mixing them with air carried to a high temperature by its passage through the regeneration chambers and producing ignition of said gases directly they pass into the working chamber of the furnace. The furnace is further provided with cooling means for the outer walls of the hearths assuring their preservation in spite of the high temperature to which they are carried.

The invention further comprises means for regulating the circulation of air and gases and the action of the working and combustion chambers.

The invention will be understood by reference to the annexed drawings in which the same reference letters indicate the same parts in the different figures.

Figure 1 is a longitudinal section of the improved furnace. Fig. 2 is a horizontal section on line 2—2 of Fig. 1. Fig. 3 is a transverse section on line 3—3 and Fig. 4 a transverse section on line 4—4 of Fig. 1.

A indicates the working chamber of the furnace which is divided into several basins or hearths by hollow partitions B through which a current of fresh air circulates. The bottom C of the hearths, which latter are limited by the walls of the furnace and the partitions B, is supported at intervals by blocks of refractory material D which rest on the sole E of the furnace which is itself supported on arched masonry in the usual manner. At each end of the furnace the combustion chambers, the regenerating chambers and the chimneys are grouped.

F F$^1$ are the two combustion chambers or gazogenes communicating by the channels G G$^1$ with the working chamber of the furnace. Behind them and separated by spaces I I$^1$ through which fresh air circulates for cooling the roofs of the combustion chambers are the regenerating chambers H H$^1$ H$^2$ H$^3$ each comprising checkerwork $h$ $h^1$ $h^2$ $h^3$. The air drawn in from outside through channels $n$ $n^1$ $n^2$ $n^3$ formed in the masonry, is heated by contact with the checkerwork $h$ $h^1$ $h^2$ $h^3$, and brought to a high temperature by the flow of the combustion gases from the combustion chambers. This hot air emanating alternately from one of the chambers H and H$^3$ or H$^1$ and H$^2$ is drawn into the working chamber of the furnace through channels J J$^1$ formed in the walls of the regenerating chambers and is directed into the channels G G$^1$ to assist the draft and for burning the combustion gases from the combustion chambers or gazogenes F F$^1$. For this purpose the channels J J$^1$ are provided at their upper part with registers L L$^1$ operated from outside and which allow of directing the hot air from the chambers H and H$^3$ or H$^1$ and H$^2$ into the channels J J$^1$. Further registers M M$^1$ M$^2$ M$^3$ operated exteriorly and preferably coupled together are arranged at the upper part of the regeneration chambers and allow of evacuating the burnt combustion gases from the chambers H and H$^3$ or H$^1$ and H$^2$ into the chimneys K and K$^1$. The combustion gases from the combustion chambers F F$^1$ made inflammable by the hot air introduced through the channels, may be conducted alternately into the regenerator chambers H$^1$ or H$^2$ or H and H$^3$ by the following means: Extending along the walls of the furnace and at the lower part thereof masses of masonry N are arranged provided with channels $n$ $n^1$ $n^2$ $n^3$ and at the middle of which are two chambers O O$^1$ provided with reversing dampers P P$^1$ arranged in reverse direction to one another. By means of these dampers the working chamber of the furnace may be put into communication with one or other of the channels $n$ $n^1$ $n^2$ $n^3$ and with one or other of the regeneration chambers H and H³ or H¹ and H².

The action of the furnace is as follows:— The fires on F F¹ being alight, the hearths filled with a substance to be melted and the dampers P and P¹ arranged for example as indicated in Fig. 1 the registers M¹ M² are opened and the registers L and L¹ are adjusted to the positions shown in Fig. 2 in order to facilitate and render the action of the fires more active. The air drawn in from the outside of the furnace through the lower openings of the chambers O and O¹ is directed by means of the dampers P and P¹ through the channels $n$ and $n^3$ into the regenerating chambers H and H² where it is carried to a high temperature. After having traversed these chambers it passes into the working chamber of the furnace at the lower part of the channels J and J¹ where it comes into contact with the combustion gases flowing from the combustion chambers at G G¹; the mixture by reason of its high temperature ignites and expands above the hearths heating the vault of the furnace to a great heat and the radiation of heat therefrom heats the substances contained in the hearths, and also the gases themselves in their circulatory movement. When the two hot gaseous currents reach the middle of the furnace they are drawn by the lateral chambers O O¹ and pass through the openings R and R¹. The dampers P and P¹ being conveniently adjusted the hot gases are directed through the channels $n^1$ and $n^2$ into the regenerator chambers H¹ and H² where they circulate through the checkerwork $h^1$ and $h^2$, which is thus brought to a high temperature before the gases pass into the chimneys K and K¹. After a certain time the circulation of the gas is reversed by reversing the dampers P and P¹ and by closing the registers which were open and opening those which were closed. The chambers H¹ and H² previously operating as absorption regenerator chambers now become heating regeneration chambers while the chambers H and H² act as absorption regenerator chambers for the burnt gases. The gaseous currents from the fires are drawn into the chambers O and O¹ then directed by the dampers P and P¹ into the chambers H and H² and from there into the chimneys K and K¹ the registers M and M² being then open. The fresh air is directed into the channels $n^1$ and $n^2$ then into the regenerating chambers H¹ and H² where it is heated by contact with the checkerworks $h^1$ and $h^2$ previously brought to a high temperature; it then passes into the channels J J¹ and G G¹ where it serves to inflame the combustion gases. After a certain period of action the position of the registers is again changed and the circulation first described recommences and so on. By this method of circulation a more regular and more easily regulated action is obtained than in furnaces generally; the rate of combustion is less for a given temperature and high temperatures such as are necessary for the fusion of silica or of minerals are more rapidly attained.

What I claim as my invention and desire to secure by Letters Patent of the United States is:—

1. In a reverberatory furnace, the combination with a working chamber, lateral chambers arranged on each side of the furnace and each communicating with said working chamber, a plurality of regenerators arranged at the end of the furnace, flues connecting each lateral chamber with the regenerators, conduits for admitting air to said flues beneath said lateral chambers, reversible dampers in said flues for directing currents of gas and air in alternate directions, and valved conduits connecting the regenerators with the furnace chamber.

2. In a reverberatory furnace, the combination with a working chamber, lateral chambers arranged on each side at the middle of the furnace and each communicating with said working chamber, a plurality of regenerators arranged at each end of the furnace, flues connecting each lateral chamber with the regenerators at each end of the furnace, conduits for admitting air to said flues beneath said lateral chambers, reversible dampers in said flues for directing currents of gas and air in alternate directions, and valved conduits connecting the regenerators with the furnace chamber at each end.

3. In a reverberatory furnace, the combination with a working chamber, lateral chambers arranged on each side at the middle of the furnace and each communicating with said working chamber, a plurality of regenerators arranged at each end of the furnace, flues connecting each lateral chamber with the regenerators at each end of the furnace, conduits for admitting air to said flues beneath said lateral chambers, reversible dampers in said flues for directing currents of gas and air in alternate directions, valved conduits connecting the regenerators with the furnace chamber at each end, chimneys at each end of the furnace, and dampers controlling the flow of gases from the regenerators to the chimneys.

4. In a reverberatory furnace, the combination with a working chamber having a gazogene at each end, lateral chambers arranged on each side at the middle of the furnace and each communicating with said working chamber, a plurality of regenerators arranged at each end of the furnace, flues connecting each lateral chamber with the regenerators at each end of the furnace, conduits for admitting air to said flues beneath said lateral chambers, reversible dampers in said flues for directing currents of gas and air in alternate directions, and valved conduits connecting the regenerators with the furnace chamber at each end.

In witness whereof I have signed this specification in the presence of two witnesses.

ANTOINE VERZIER.

Witnesses:
 MASSARDIER ANTOINE,
 PICHON BENOIT.